United States Patent [19]

Hulbert, Jr. et al.

[11] 4,240,952

[45] Dec. 23, 1980

[54] METHOD OF MAKING CONCRETE FROM FLY ASH

[75] Inventors: Clarence E. Hulbert, Jr., 928 N. York, Muskogee, Okla. 74401; Liang-Tseng Fan; Mufit Akinc, both of Manhattan, Kans.

[73] Assignee: Clarence E. Hulbert, Jr., Muskogee, Okla.

[21] Appl. No.: 3,589

[22] Filed: Jan. 15, 1979

[51] Int. Cl.$^2$ .............................................. C04B 7/14
[52] U.S. Cl. ................................ 260/42.13; 106/103; 106/97; 106/DIG. 1
[58] Field of Search ............. 106/97, 98, 103, DIG. 1; 260/42.13, 29.63

[56] References Cited

U.S. PATENT DOCUMENTS

| 2,752,261 | 6/1956 | Dournaud | 106/103 X |
| 3,565,548 | 2/1971 | Mori et al. | 106/DIG.1 X |
| 3,895,953 | 7/1975 | Mehta | 106/97 |

FOREIGN PATENT DOCUMENTS 940692  10/1963  United Kingdom ............. 106/DIG. 1

*Primary Examiner*—G. O. Peters
*Attorney, Agent, or Firm*—William S. Dorman

[57] ABSTRACT

In a method of making concrete of the Portland Cement type wherein a quantity of cementitious material, such as Portland Cement, is mixed with a quantity of aggregate, generally sand and rock in varying proportions and water; and, wherein, the resulting mixture is stirred or mixed for an appropriate length of time consistent with acceptable practices in the concrete industry after which the mix is poured and allowed to set, the improvement which is characterized by the employment of fly ash as the major ingredient in the cementitious material. The improvement also includes the adding of gypsum to the initial mix in an amount equal to about 2% by weight of the fly ash and, thereafter, adding in and mixing a quantity of calcium chloride equal to about 3% by weight of the fly ash. As an added feature, a quantity of organic material, such as a latex emulsion, can be added to the initial mix to improve the flow characteristics of the concrete mix and to improve the physical characteristics of the ultimate concrete.

6 Claims, No Drawings

METHOD OF MAKING CONCRETE FROM FLY ASH

BACKGROUND OF THE INVENTION

1. Field of the Invention

The present invention relates to concrete and a method of making the same and, more particularly, to a concrete and its method of manufacture wherein relatively larger quantities of fly ash can be incorporated in the concrete than heretofore thought possible.

2. The Prior Art

The prior art teaches the making of concrete from Portland Cement, aggregate (generally a mixture of a fine aggregate such as sand and a coarse aggregate such as gravel or crushed rock), and water. A typical concrete, for example, could be made from 470 pounds of Portland Cement, 1612 pounds of sand, 1736 pounds of crushed rock and 250 pounds of water. The relative portions of Portland Cement, sand and rock will vary depending upon the requirements for the end product. The prior art teaches the employment of organic and inorganic additives to improve or vary the properties of the resulting concrete end product.

It has also been proposed in the past to substitute fly ash for certain portions of the Portland Cement. The term "fly ash" as used herein, is intended to indicate the finely divided ash residue produced by the combustion of pulverized coal or lignite, which ash is carried off with the gases exhausted from the furnace in which the coal or lignite is burned and which is collected from these gases usually by means of suitable precipitation apparatus such as electrical precipitators. Those finely pulverized ashes resulting from combustion of oil or from combustion of waste materials in a large incinerator, or natural pozzolans, can also be utilized as "fly ash" providing their chemical compositions are reasonably similar to fly ash produced by the combustion of pulverized coal or lignite. Fly ash is generally obtained in a finely divided state such that usually, at least 70% by weight passes through a 200-mesh sieve, although incinerator ashes may be considerably coarser. Fly ash may be considered an "artificial pozzolan," as distinguished from a "natural pozzolan."

Fly ash, for the most part, is considered to be a waste product, whereas, Portland Cement is a relatively expensive product and, sometimes, in short supply. Thus, the substitution of fly ash for a portion of the Portland Cement in a concrete mix will serve several desirable ends: first of all, it will reduce the cost of making the concrete; secondly, it will tend to conserve the supply of Portland Cement; and, thirdly, it will utilize a waste product.

On a straight substitution basis, generally no more than about 20% of the Portland Cement can be replaced by fly ash; otherwise, the resulting concrete product is inferior or unsuitable as a structural concrete.

There is much in the literature that deals with the properties of Portland Cement and the chemical reactions which occur during the formation of concrete. Briefly stated, however, Portland Cement is generally considered to be comprised of lime, silica, alumina and iron oxide. In the United States, Portland Cement, as purchased, generally contains about 2% by weight of gypsum (calcium sulphate) which is added as a retarder. When Portland Cement is mixed with water, a chemical reaction begins between the various compounds and the water. In the initial stages, the small quantity of retarder quickly goes into solution, and is, thus, enabled to exert its influence on the other chemcial reactions which are starting. These chemical reactions result in the formation of the various compounds which cause setting and hardening, the four most important being: tricalcium aluminate which hydrates very rapidly and produces a considerable amount of heat, causing initial stiffening but contributing the least to the ultimate strength; tricalcium silicate, which jellifies within a few hours, generating considerable heat and having a marked effect on the strength of the concrete in its early stages, mainly in the first fourteen days; dicalcium silicate whose formation proceeds slowly with a slow rate of heat evolution and which is mainly responsible for the progressive increase in strength which occurs from fourteen to twenty-eight days and beyond; and, tetracalcium alumino-ferrite which appears to have no marked effect on the strength or other properties of the hardened cement.

Fly ash is similar to Portland Cement in that it also contains certain amounts of lime, silica, alumina and iron oxide. However, where Portland Cement normally contains preferably, about 60% by weight of lime, fly ash fly will contain from 5 to 30% of lime depending upon the source of the fly ash. Again, where Portland Cement contains, preferably, about 20% silica, fly ash will contain from 20 to 60% by weight of silica, depending upon its source. As far as alumina is concerned, Portland Cement will normally include less than 10%, say about 6%, whereas fly ash will contain from 15 to 30% alumina. Finally, with regard to iron oxide, both the Portland Cement and the fly ash contain about less than 10%, with the Portland Cement averaging between 3 and 4% iron oxide and the fly ash averaging about 7 to 8% iron oxide. The fly ash, in addition, contains further impurities in the nature of sulphur trioxide and magnesium oxide.

On the surface, at least, it would appear that fly ash had similar cementitious properties and could, therefore, be substituted as desired for Portland Cement. (This is disregarding the physical properties of the fly ash as compared to the physical properties of Portland Cement.) However, in practice, fly ash is not fully substitutable for Portland Cement. In the ready-mix concrete industry, it is recommended that no more than 20% of the Portland Cement be replaced by fly ash. The literature suggests that the maximum substitution of fly ash should not exceed 50%. The reason why higher percentages of fly ash cannot be used in concrete is perhaps, not fully understood. It has been theorized that one of the phenomena which limits the quantity of fly ash in cement is the occurance of inert coats on the fly ash particles. The coating on the fly ash particle is believed to occur during the process of burning the coal or lignite so that it does not allow the considerable pozzolanic energy contained in the fly ash to be utilized.

The above comments regarding the possible substitution of fly ash for Portland Cement in concrete have basic reference to untreated fly ash. However, the prior art suggests that the amount of fly ash which can be incorporated into concrete can be relatively increased where the fly ash is treated by various chemical, thermal or mechanical techniques or combinations of these techniques.

The prior art also teaches that the properties of concrete can be improved or modified by adding an organic material to the concrete mix. One such organic additive is a styrene-one, three butadiene copolymer latex emulsion; other organic additives include a polyvinylidene chloride latex, methyl methacrylate, styrene, a copolymer of methyl methacrylate and styrene, and other similar organic materials.

SUMMARY OF THE INVENTION

The present invention pertains to the manufacture of concrete which is normally made from Portland Cement and, wherein, a substantial portion (at least 50%) of the Portland Cement is replaced with untreated fly ash. For example, 140 pounds of Portland Cement were mixed with 560 pounds of fly ash, 1000 pounds of sand, 2000 pounds of aggregate (rock one-half inch to five-eighths inch) 11 pounds of gypsum, 10.37 pounds of a styrene-1,3 butadiene copolymer latex emulsion, and 160 pounds of water; these ingredients were mixed until the proper blend was reached using conventional concrete mixing techniques and, thereafter, 16.37 pounds of calcium chloride dissolved in 157 pounds of water were added to the mix; the resulting mixture was further mixed until a proper blend was created following conventional concrete mixing techniques and then the mass was poured and allowed to set. The slump test was 5 inches. After three days, the concrete tested at 1981 psi; after seven days it tested at 3183 psi; after fourteen days it tested at 4209 psi; after twenty-one days it tested at 4775 psi; and after twenty-eight days it tested out at 4987 psi.

The fly ash which was used contained a considerable amount of cementitous ingredients; however, its application as a cement material would normally be limited to 20% replacement of Portland Cement because of its low compressive strength and its very fast set-up time which makes field applications difficult. Although commercial Portland Cement normally contains about 2% by weight of gypsum, it will be noted that an additional amount of gypsum is added to the above mix representing about 2% by weight of the fly ash. It is believed that the calcium sulphate (gypsum) acts as a set retarder by forming a sulpho-aluminate layer around the particles of Portland Cement and around the particles of fly ash. This sulpho-aluminate layer slows down the dissolution of alumina and lime and, thus, inhibits hydration. When the calcium chloride is added to the concrete mixture, it reactivates the cementitous materials (both the fly ash and the Portland Cement) by breaking the sulpho-aluminate layer. The effect of the gypsum followed by the calcium chloride on the fly ash particles is such as to make the fly ash particles behave more nearly like the Portland Cement particles; the very fast set-up time of the fly ash appears to be reduced considerably, whereby it is now possible to utilize substantially all of the pozzolanic energy contained in the fly ash.

DETAILED DESCRIPTION OF THE PREFERRED EMBODIMENTS

It has been found unexpectedly that large percentages of untreated fly ash can be incorporated into a concrete product employing the method of the present invention. In most of the examples referred to below the fly ash was obtained from the power plant of Oklahoma Gas and Electric Co. (O.G.&E.) of Muskogee, Oklahoma. The fuel which was burned was a lignite coal and the fly ash produced was a Class C artificial pozzolan conforming with the standards of ASTM C618-77 for use as a mineral admixture in Portland Cement type concrete.

A representative analysis of the O.G.&E. (Muskogee) fly ash showed about 28.1% by weight of Calcium Oxide; 31.3% Silica; 24.3% Alumina; 7.7% Ferric Oxide; 4.8% Magnesium Oxide; and 2.5% Sulphur Trioxide.

The Portland Cement, sand, rock, gypsum and calcium chloride used in the following examples were purchased locally. The organic (latex) modifier was a styrene-1, 3 butadiene copolymer latex emulsion sold under the trademark "Thermoflex" 8002 and manufactured by Reichhold Chemicals Inc. of White Plains, New York.

EXAMPLE I 140 lbs. of Portland Cement was mixed with 560 lbs. of fly ash (Muskogee O.G.&E.), 1000 lbs. of sand, 2000 lbs. of rock ($\frac{1}{2}$" to $\frac{5}{8}$") 10.37 lbs. of Thermoflex 8002, 11 lbs. of gypsum and 160 lbs. of water. After mixing the above ingredients together, 16.37 lbs. of calcium chloride mixed with about 157 lbs. of water to form 173 lbs. of calcium chloride solution was added to the above ingredients, and further mixing occurred after which the entire mixture was poured to set. The slump was 5 inches using the standard 12" cone slump test. The compressive strength of the concrete produced by the above method was tested after 3, 7, 14, 21 and 28 days and results were 1981, 3183, 4209, 4775 and 4987 psi, respectively.

EXAMPLE II

A concrete was made using the same ingredients and the same method as set forth in Example I above except that the total aggregate mix included 1200 lbs. of sharp sand and 1800 lbs. of rock ($\frac{1}{2}$" to $\frac{3}{4}$") (substituted for the 1000 lbs. of sand and 2000 lbs. of rock set forth above). Compressive strength tests of this sample after 3, 7, 14, 21 and 28 days showed results of 2157, 3714, 4421, 4987 and 5270 psi, respectively. The slump test for this example was 4 inches.

In the above two examples, the cementitous materials comprised about 80% fly ash and 20% Portland Cement and yet the resulting concrete showed considerably higher compressive strength than concrete prepared from the standard 5 sack mix of Portland Cement alone. In order to determine the effect of the different ingredients in the 80% fly ash mix, additional tests were made as indicated below.

EXAMPLE III

Similar to the steps employed in Example I above, 140 lbs. of Portland Cement, 560 lbs. of fly ash, 1000 lbs. of sand, 2000 lbs. of rock, 11 lbs. of gypsum and 250 lbs. of water were mixed together, poured and allowed to set. Note that no Thermoflex and no calcium chloride were included. After 7 days the concrete tested out at a compressive strength of only 301 psi.

EXAMPLE IV

The same ingredients of Example III were mixed together, but 16.37 lbs. of calcium chloride mixed with 62 lbs. of water to make a calcium chloride solution of 78 lbs. was included in the mix, and the entire mix was poured and allowed to set. Note that no Thermoflex was added. After 7 days the concrete tested out at a compressive strength of 3395 psi which is comparable to the results obtained in Example I.

EXAMPLE V

The same ingredients of Example III were mixed together but an additional 9 lbs. of Thermoflex was included in the mix and the mixture was poured and allowed to set. No calcium chloride was added. After 7 days, the concrete tested out at a compressive strength of only 672 psi.

EXAMPLE VI

The same ingredients and procedures set forth in Example V were followed except that one-half (39 lbs.) of the calcium chloride solution prepared in Example IV was added to the initial mix. The initial mix was stirred for 15 minutes and let set for 2 hours. Now the remainder (39 lbs.) of calcium chloride solution (prepared as in Example IV) was added, the mixture was stirred for 15 minutes and then poured to set. After 7 days the compressive strength of this concrete tested out at only 690 psi.

In the foregoing examples, the amounts of the ingredients involved in each example would, volumetrically, produce a quantity of cement equal to approximately 32 cubic feet which is defined as the "long" yard. The standard cubic yard employed in the concrete industry is actually 27.2 cubic feet which is slightly in excess of the mathematical 27 cubic feet to allow for contraction of the concrete during the setting process. If the amounts set forth in the preceding examples were converted to the standard yard, the relative amounts of Portland Cement and fly ash would be 129 lbs. and 516 lbs., respectively; the relative quantities of the remaining ingredients would be reduced proportionately in like manner.

It is within the scope of this invention to replace all of the Portland Cement with fly ash; from a practical standpoint, however, a concrete mix prepared completely from fly ash does not "look" like a mixture prepared from Portland Cement, and it is feared that this difference in appearance might lead to an initial reluctance on the part of the concrete industry to except a concrete mix which contained no Portland Cement. Accordingly, the present invention includes 20% by weight of Portland Cement in the cementitous materials such that the resulting mix does indeed look like a Portland Cement mix.

From the foregoing examples, it should appear that gypsum is added to the mix to the extent of about 2% by weight of the fly ash. The calcium chloride is added to the extent of about 3% of the weight of the fly ash. If a quicker setting time is desired, a slightly relatively larger quantity of calcium chloride can be employed; conversely, if a longer setting time is desired for the concrete, a relatively smaller quantity of calcium chloride can be employed.

Commercial Portland Cement normally contains about 2% by weight of gypsum which is added as a retarder. In the example set forth herein, an additional amount of gypsum is added to the mix to the extent of about 2% by weight of the fly ash. It is believed that the calcium sulphate (gypsum) acts as a set retarder by forming a sulpho-aluminate layer around the particles of Portland Cement and around the particles of fly ash. This sulpho-aluminate layer slows down the dissolution of alumina and lime and, thus, inhibits hydration. When calcium chloride is added to the concrete mixture, it reactivates the cementitous materials (both the fly ash and the Portland Cement) by breaking the sulpho-aluminate layer. The effect of the gypsum followed by the calcium chloride on the fly ash particles is such as to make the fly ash particles behave more nearly like the Portland Cement particles; the very fast set-up time of the fly ash appears to be reduced considerably, whereby it is possible to utilize substantially all of the pozzolanic energy contained in the fly ash.

The calcium chloride employed in the above examples acts as an accelerator; this invention contemplates the employment, in whole or in part, of other accelerators considered acceptable by the concrete industry, where possible.

The Thermoflex material which is added to the concrete mix acts as a lubricant and also helps in the handling of the concrete mix during the transportation and pouring. In the presence of liquid water, it will not form a polymeric layer which would normally prevent the hydration process. However, after the hydration process is completed (and all the liquid water is converted to crystal water), the latex will set and form a relatively impervious layer which exhibits low water permeability in addition to its binding character. Other organic materials could be employed instead of the Thermoflex specifically referred to above. For example, it is possible to use polyvinylidene chloride (Saran) latexes as well as styrene-butadiene latexes. Other organic materials or latexes which are considered acceptable to the concrete industry can be employed with the concrete mixes of the present invention.

What is claimed is:

1. A method of making concrete which comprises the steps of mixing together a quantity of a cementitous material which includes fly ash as a major ingredient therein, a quantity of aggregate, a quantity of gypsum equal to about 2% by weight of the fly ash and water to form an initial mix, thereafter adding calcium chloride in an amount equal to about 3% by weight of the fly ash, further mixing and pouring the same to set.

2. A method of making concrete as set forth in claim 1 which comprises the steps of mixing together 140 parts by weight of Portland Cement, 560 parts of fly ash, 1000 parts of sand, 2000 parts of rock, 11 parts of gypsum and 160 parts of water, mixing the above ingredients together, adding to the above ingredients 173 parts of a calcium chloride solution obtained by mixing 16 parts of calcium chloride with about 157 parts of water, further mixing the resulting mixture and pouring the same to set.

3. A method of making concrete as set forth in claim 2 which includes adding to the initial mix approximately 10 parts by weight of a latex emulsion formed from styrene and 1, 3 butadiene.

4. A method of making concrete as set forth in claim 1 which includes mixing together 140 parts by weight of Portland Cement, 560 parts of fly ash, 1200 parts of sand, 1800 parts of rock, 11 parts of gypsum, and 160 parts of water, mixing the above ingredients together, adding to the above mix 173 parts of a calcium chloride solution prepared by mixing together 16 parts of calcium chloride with approximately 157 parts of water, further mixing the above resulting mixture and pouring the same to set.

5. A method of making concrete as set forth in claim 4 which includes adding to the initial mix approximately 10 parts by weight of a latex emulsion formed from styrene and 1, 3 butadiene.

6. A method of making concrete as set forth in claim 1 wherein the cementitous material includes approximately 20% by weight of Portland Cement and approximately 80% by weight of fly ash.

* * * * *